US008474654B2

(12) United States Patent
Snow et al.

(10) Patent No.: US 8,474,654 B2
(45) Date of Patent: Jul. 2, 2013

(54) IN-STORE SAMPLE DISPENSER

(75) Inventors: John Douglas Snow, Guilford, CT (US); Andrew Zachery Wilder, Brewster, NY (US)

(73) Assignee: Conopco, Inc., Englewood Cliffs, NJ (US)

( * ) Notice: Subject to any disclaimer, the term of this patent is extended or adjusted under 35 U.S.C. 154(b) by 163 days.

(21) Appl. No.: 13/099,568

(22) Filed: May 3, 2011

(65) Prior Publication Data

US 2012/0279985 A1 Nov. 8, 2012

(51) Int. Cl.

| | |
|---|---|
| ***G01F 11/00*** | (2006.01) |
| ***B67D 7/06*** | (2010.01) |
| ***B65D 88/54*** | (2006.01) |
| ***G01F 13/00*** | (2006.01) |

(52) U.S. Cl.
USPC .................. 222/1; 222/82; 222/192; 222/251

(58) Field of Classification Search
USPC ........... 222/23, 80, 81, 192, 251; 40/406–408
See application file for complete search history.

(56) References Cited

U.S. PATENT DOCUMENTS

| | | | | |
|---|---|---|---|---|
| 2,446,226 | A * | 8/1948 | Gustave | 215/262 |
| 4,572,361 | A * | 2/1986 | Fontlladosa | 206/756 |
| 5,988,451 | A * | 11/1999 | Hanna | 222/255 |
| 6,119,901 | A * | 9/2000 | Hanna | 222/321.1 |
| 6,386,392 | B1 | 5/2002 | Argentieri | |
| 2004/0164093 | A1 * | 8/2004 | Redman et al. | 222/95 |
| 2004/0217197 | A1 | 11/2004 | Mazooji | |
| 2005/0017146 | A1 * | 1/2005 | Kringel et al. | 248/313 |
| 2009/0294479 | A1 | 12/2009 | Sottosanti, Jr. et al. | |

FOREIGN PATENT DOCUMENTS

| | | |
|---|---|---|
| FR | 2712471 | 11/1993 |

OTHER PUBLICATIONS

PCT International Search Report in PCT application PCT/EP2012/057896 dated Jul. 5, 2012 with Written Opinion.
Co-Pending U.S. Appl. No. 13/099,580, filed May 3, 2011; entitled: Spray Product Sample Dispenser and Merchandising Product Display.

* cited by examiner

*Primary Examiner* — Paul R Durand
*Assistant Examiner* — Vishal Pancholi
(74) *Attorney, Agent, or Firm* — Michael P. Aronson

(57) ABSTRACT

A sample dispenser is provided allowing a consumer to sample a product. The dispenser includes a dosing unit having a mechanical pump and a nozzle for dispensing sampling amounts of the flowable substance. The dispenser also includes a cradle assembly featuring a cap and a dock, the dock having a receiving area and therein a floor from which projects an upwardly oriented hollow connector with a plastic wall piercing mouth. The cap is fittable over a product container. Tubing connects the pump and hollow connector allowing communication of the flowable substance between the product container and pump. Also provided is a method to allow a consumer to sample the product. The method includes providing the sample dispenser as described above, and activating the dosing unit to deliver a portion of the flowable substance to the consumer.

7 Claims, 4 Drawing Sheets

IN-STORE SAMPLE DISPENSER

BACKGROUND OF THE INVENTION

1. Field of the Invention

The invention concerns a sample dispenser and method which allows a consumer to test products, especially flowable foods and personal care liquid products, prior to purchase in a retail establishment.

2. The Related Art

Retail stores and especially the department and specialty cosmetic stores have counters displaying open packages. These allow consumers to test products. Some of these products are delivered in wide mouth jars. Others are packaged in less product exposed containers. Usually there is very little supervision in the sampling. Chances are high for microbial contamination.

Still another issue is the scarcity of shelf space. Retailers prefer to use shelf space for purchasable product rather than for bulky non-revenue generating sample dispensers.

U.S. Patent Application Publication No. 2009/0294479 A1 (Spttosanti et al.) discloses progress in providing an on-shelf sample dispenser with a combined merchandising unit product display. There are some drawbacks with this technology. Prime is the difficult logistics of providing a refill bladder or pouch. These refills need to be custom manufactured. Low unit volumes and specialty sourcing mean extra costs.

Accordingly, there is a need for sample dispensers for a retail environment that can readily be refilled. Moreover, there also is a need for a more efficient, less wasteful and quicker mechanism in replacing one product variant for another within the same sample dispensing system.

SUMMARY OF THE INVENTION

A sample dispenser is provided which includes:

(i) a dosing unit having a mechanical pump and a nozzle for dispensing sampling amounts of a flowable substance, the mechanical pump communicating with the nozzle;

(ii) a cradle assembly including a cap and a dock, the dock having a receiving area and therein a floor from which projects an upwardly oriented hollow connector with a plastic wall piercing mouth, the cap being fittable over a product container;

(iii) tubing connecting the pump and the hollow connector allowing communication of the flowable substance between the product container and the pump.

Also provided is a method to allow a consumer to sample a product, the method including:

(A) providing a sample dispenser for dosing a flowable substance, the dispenser including:

(i) a dosing unit having a mechanical pump and a nozzle for dispensing sampling amounts of a flowable substance, the mechanical pump communicating with the nozzle;

(ii) a cradle assembly including a cap and a dock, the dock having a receiving area and therein a floor from which projects an upwardly oriented hollow connector with a plastic wall piercing mouth, the cap being fittable over a product container; and (iii) tubing connecting the pump and the hollow connector allowing communication of the flowable substance between the product container and the pump.

(B) activating the dosing unit to deliver a portion of the flowable substance to the consumer.

DETAILED DESCRIPTION OF THE DRAWING

The various features and benefits of the present invention will become more apparent through consideration of the following drawing in which.

DETAILED DESCRIPTION OF THE INVENTION

Now is disclosed a more efficient sample dispenser with an improved refill system. The original and subsequent refill containers may utilize the actual packaged retail product. No longer is there need to identify a bladder, pouch or other refill sampling reservoir that must be separately inventoried from the on-sale packages of product. Also it is very simple to change from one product variant to another. No longer is an extensive clean out of the lines necessary. All that is necessary is for a package of the new variant product to be inserted into an empty cradle assembly and the original variant package held in its cradle assembly to be removed.

Figure 1:
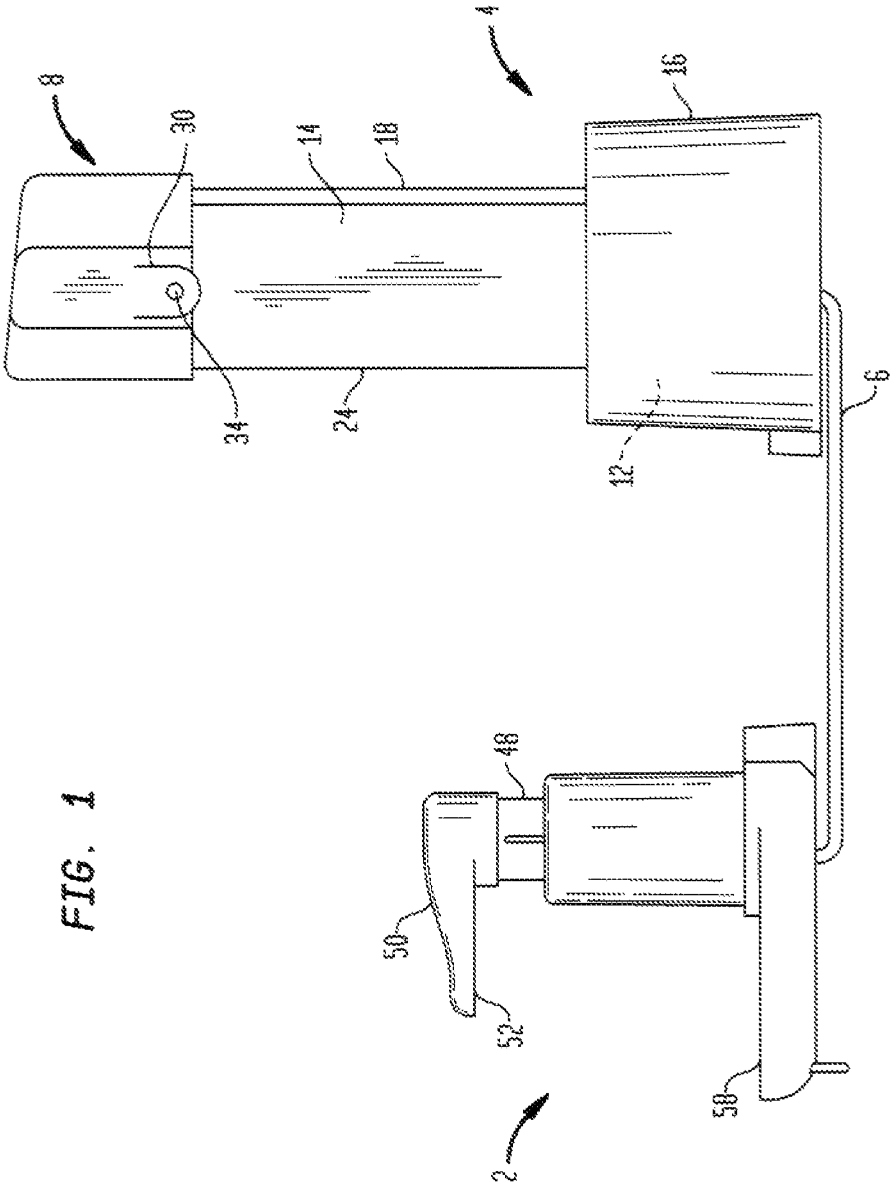
FIG. 1 is a side view of a sample dispenser in accordance with one embodiment of the invention.
Figure 2:
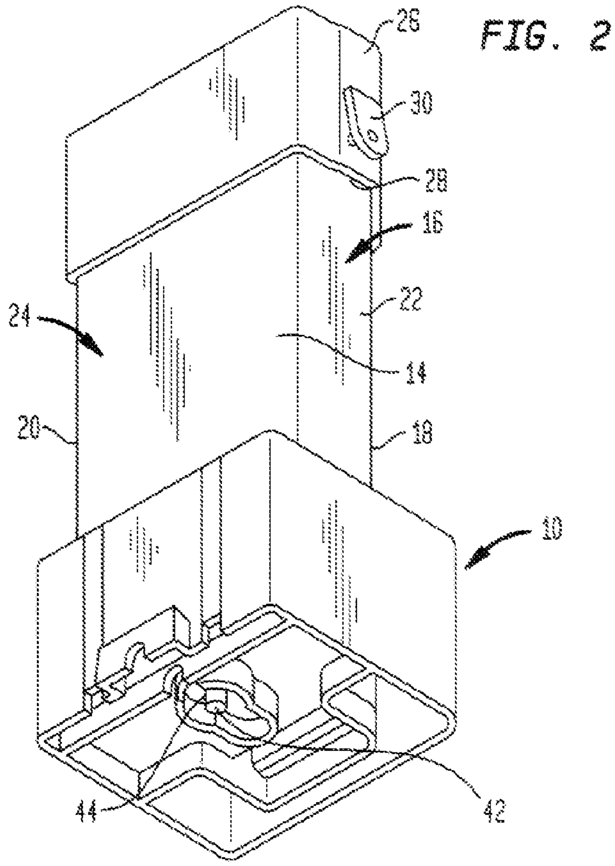
FIG. 2 is a perspective, view detailing an underside of a cradle assembly according to one embodiment of the invention.
Figure 3:
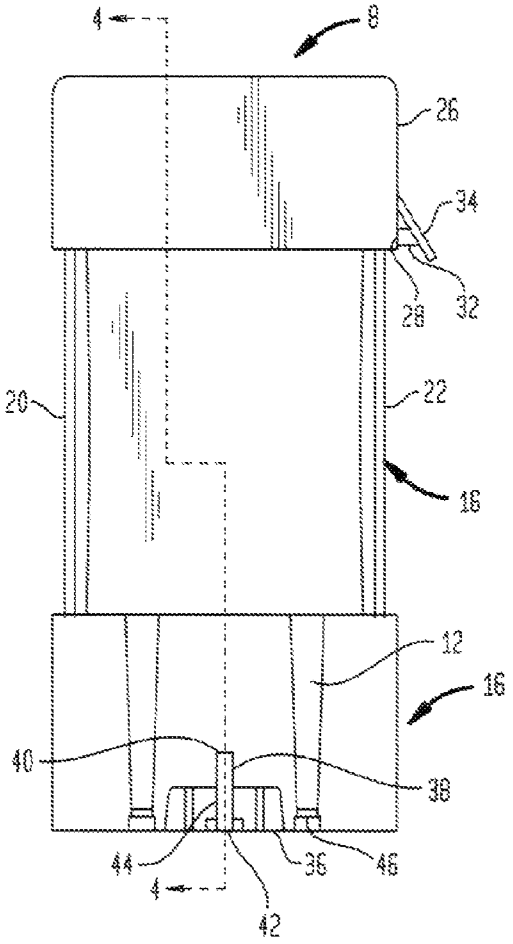
FIG. 3 is a front view of the cradle assembly showing a cross sectional view of the cradle dock.

FIG. 1 illustrates one embodiment of the sample dispenser. The dispenser features a dosing unit 2 and a cradle assembly 4. Flowable product can move via tubing 6 from the cradle assembly to the dosing unit. The cradle assembly includes a cap 8 and a dock 10, the latter having a receiving area 12. A product container 14 filled with flowable substance is fittable at a lower portion of the container into the receiving area. The cap is placable over an upper end of the product container. FIGS. 2 and 3 best illustrate shell 16 connecting the cap and dock. The shell is formed of a rear wall 18 and two side walls 20,22 that surround the product container, An open face 24 of the shell allows the product container to be insertable within the cradle assembly.

The cap is formed with a side panel 26 and has a throughgoing piercing aperture 28. Molded with the cap is a pivoting arm 30. A plastic piercing tool 32 of hollow construction projects from the pivoting arm inwardly facing toward the cradle side panel. The piercing tool at the inwardly facing end has a sharp needle point capable of puncturing a plastic wall. A terminal end of the piercing tool opposite the inwardly facing end is attached to the pivoting arm and communicates with an aperture 34 traversing the pivoting arm.

The receiving area of the dock features a floor 36 from which projects an upwardly oriented hollow connector 38. At the end of the connector is a bayonet shaped plastic wall piercing mouth 40. The term bayonet is intended to define a sharpened angular point of larger bore but similar in shape to those used in hypodermic needles.

Figure 4:
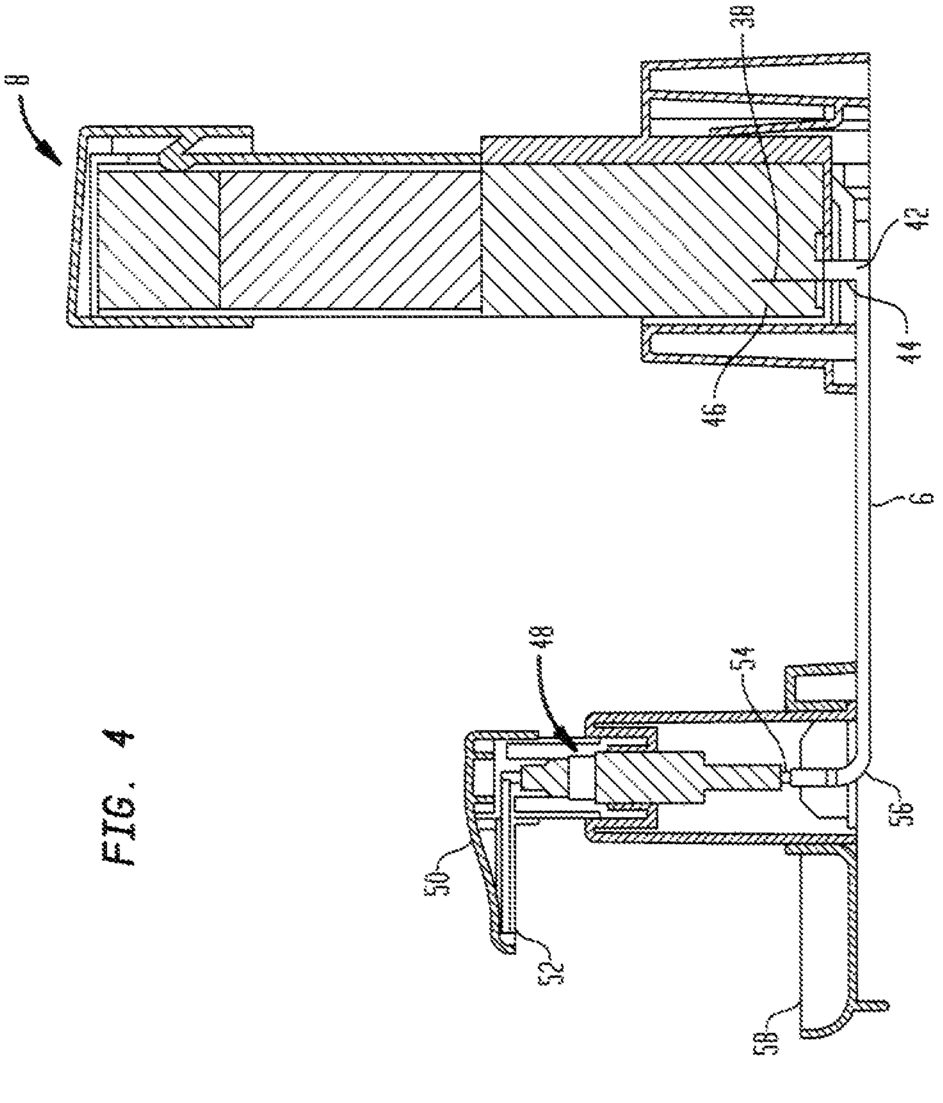
FIG. 4 is a cross sectional view of FIG. 1.

FIGS. 3 and 4 best illustrate the arrangement of the hollow connector. The outlet end 42 of the hollow connector is attached to the tubing 6 through an L-shaped joint 44. A pair of grippers 46 interact with complementary structures on shell 16 when the cradle assembly is moved downward into an activated position; (i.e. puncture by the piercing bayonet mouth of the hollow connector).

FIGS. 1 and 4 best illustrate the closing unit 2. The unit includes a mechanical pump 48 which drives flowable substance upward into the nozzle 50 having a dispensing exit 52. The mechanical pump at a lower end has an intake orifice 54 which is connected to a downstream end 56 of the tubing 6. A waste catchment 58 forms a base of the dosing unit and serves to receive any sample errantly not intercepted by a consumer's hand or other receiving substrate.

Figure 5:
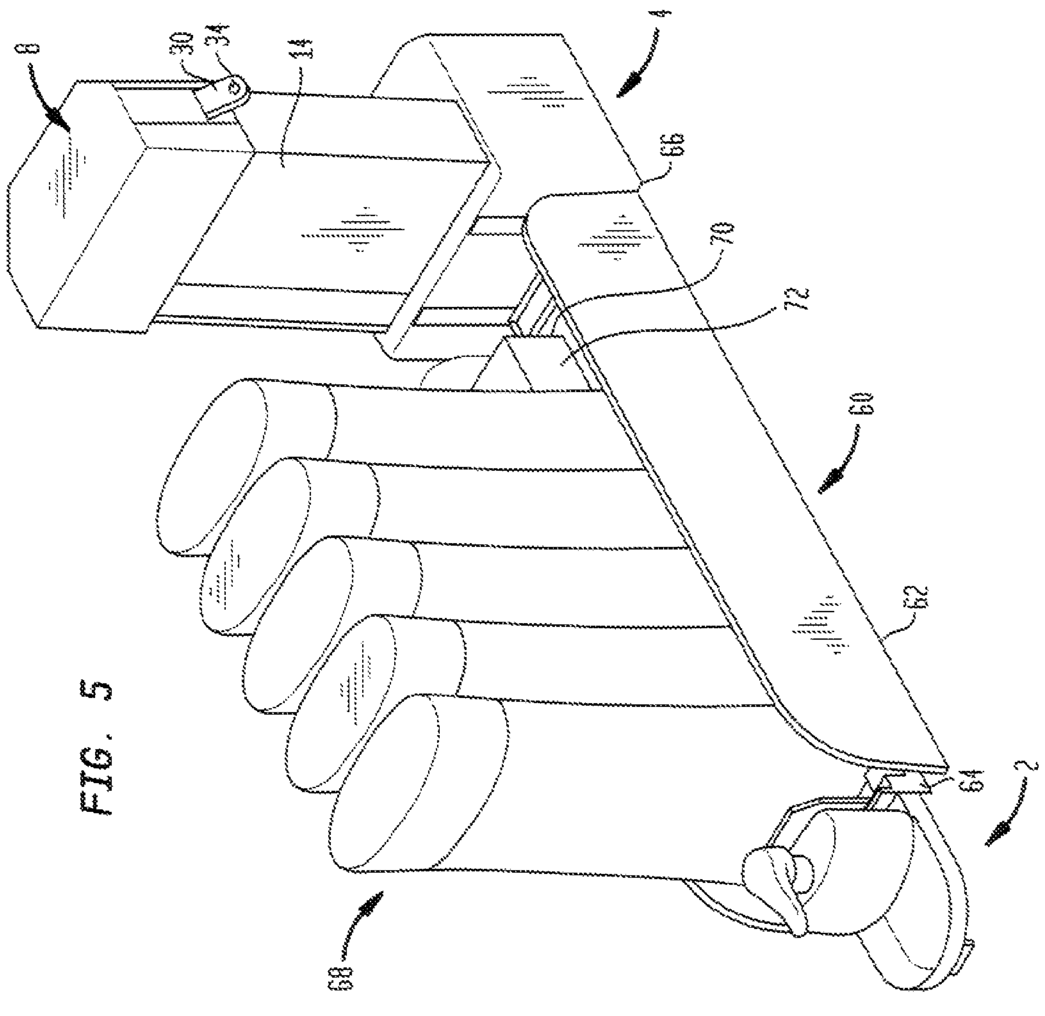
FIG. 5 is a perspective view of the sample dispenser according to FIG. 1 with; a merchandising display unit placed between the dosing unit and the cradle assembly.

FIG. 5 represents the in-store sample dispenser now combined with a merchandise product display unit 60. Unit 60 includes an elongate tray 62 having first and second ends 64,66. Tray 62 features a pair of side walls, a floor and an open roof. A set of five product containers 68 identical to the product container 14 held within the cradle assembly stand upright in stacked relationship within a trough of the tray. A set of tracks 70 traverses a length of the trough floor. A support panel 72 is movably urged along the tracks by a coiled spring mechanism. The spring mechanism advances each of the product containers as an earlier stacked container is removed from the tray.

In the embodiment shown in FIG. 5, the dosing unit is attached to a front end 64 and the cradle assembly to a rear end 66 of the elongate tray 62. Tubing 6 is guided along a channel (not shown) fashioned on an outer surface of the floor. In this way, the tubing can transmit flowable substance from the cradle assembly to the dosing unit.

A variety of flowable substances are suitable for use with the sample dispenser. These flowable substances may be foods or personal care products. Typical foods might include ketchup and mayonnaise and salad dressing. Personal care products may be such cosmetics as lotions, creams, sunblock, sunless tanners, deodorants and antiperspirants. The foregoing list is not intended to be exclusive but merely intended to show possible uses.

The present invention also contemplates a method that allows a consumer to sample a product. The method first requires providing a sample dispenser as described hereinabove. There also needs to be provided a plastic product container to serve as a reservoir for the flowable substance to be dispensed. The method also requires activating the dosing unit to deliver a portion of the flowable substance to the consumer.

Activation is accomplished in the following manner. A plastic product container filled with the flowable substance to be sampled is positioned within the shell 16, and lodged within the receiving area 12 of the cradle dock 10. An upper end of the product container will be covered with the cradle cap 8. Activation occurs by hand pressure downward onto a roof of the cap which in turn forces a bottom of the product container to be pierced by the bayonet mouth of the hollow connector 38. This allows the flowable substance to exit the product container through the hollow connector. As flowable substance evacuates the product container, there is a need to equalize pressure. Equalization is achieved by placing pressure against the pivoting arm thereby forcing the piercing tool 32 to traverse through aperture 34 and puncture a wall of the product container.

What is claimed is:

1. A sample dispenser comprising:

(i) a dosing unit having a mechanical pump and a nozzle for dispensing sampling amounts of a flowable substance, the mechanical pump communicating with the nozzle;

(ii) a cradle assembly comprising a cap and a dock, the dock having a receiving area and therein a floor from which projects an upwardly oriented hollow connector with a plastic wall piercing mouth, the cap being fittable over a product container;

(iii) tubing connecting the pump and the hollow connector allowing communication of the flowable substance between the product container and the pump, wherein the hollow connector has an outlet in the floor communicably connected to an L-shaped joint beneath the dock.

2. The dispenser according to claim 1 wherein the cap further comprises a piercing aperture and a pivoting arm having a plastic piercing tool at an end thereof inwardly directed to traverse the piercing aperture and capable of punching a vent hole into a wall of the product container.

3. A sample dispenser comprising:

(i) a dosing unit having a mechanical pump and a nozzle for dispensing sampling amounts of a flowable substance, the mechanical pump communicating with the nozzle;

(ii) a cradle assembly comprising a cap and a dock, the dock having a receiving area and therein a floor from which projects an upwardly oriented hollow connector with a plastic wall piercing mouth, the cap being fittable over a product container;

(iii) tubing connecting the pump and the hollow connector allowing communication of the flowable substance between the product container and the pump (iv) a merchandise display unit, the merchandise display unit having a front end connected to the dosing unit and a rear end connected to the cradle assembly; and wherein the merchandise display unit comprises an elongate tray having a trough with multiple product containers standing upright therein.

4. The dispenser according to claim 3 wherein the tubing is arrayed either under or alongside a length of the elongate tray.

5. The dispenser according to claim 3 wherein the product containers in the elongate tray are identical to the product container fitted into the cradle assembly.

6. A method to allow a consumer to sample a product, the method comprising:

(A) providing a sample dispenser for dosing a flowable substance, the dispenser comprising:

(i) a dosing unit having a mechanical pump and a nozzle for dispensing sampling amounts of a flowable substance, the mechanical pump communicating with the nozzle;

(ii) a cradle assembly including a cap and a dock, the dock having a receiving area and therein a floor from which projects an upwardly oriented hollow connector with a plastic wall piercing mouth, the cradle cap being fittable over a product container;

(iii) tubing connecting the pump and the hollow connector allowing communication of the flowable substance between the product container and the pump; and (iv) a merchandize display unit having a front end connected to the dosing unit and a rear end connected to the cradle assembly, the merchandise display unit comprising and elongate tray having a trough with multiple product containers stacked upright therein, (B) activating the dosing unit to deliver a portion of the flowable substance to the consumer.

7. The method according to claim 6 further comprising the step of selecting a product container for use in the cradle assembly as a supply reservoir for the flowable substance, the container being of identical shape to the multiple product containers stacked in the elongate tray.

* * * * *